(12) United States Patent
Clement et al.

(10) Patent No.: US 9,304,386 B1
(45) Date of Patent: Apr. 5, 2016

(54) SEAL RING FOR PICKUP TRUCK BOX CAMERA IN CENTER HIGH MOUNT STOP LAMP

(71) Applicant: FORD GLOBAL TECHNOLOGIES, LLC, Dearborn, MI (US)

(72) Inventors: Chad Clement, Belleville, MI (US); Gary Edward Henige, Northville, MI (US); Sleiman N. Abdelnour, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/828,036

(22) Filed: Aug. 17, 2015

(51) Int. Cl.
*G03B 29/00* (2006.01)
*B60Q 1/00* (2006.01)

(52) U.S. Cl.
CPC .............. *G03B 29/00* (2013.01); *B60Q 1/0023* (2013.01)

(58) Field of Classification Search
CPC .............................. G03B 29/00; B60Q 1/0023
See application file for complete search history.

(56) References Cited

U.S. PATENT DOCUMENTS

| | | | | |
|---|---|---|---|---|
| 6,151,065 A * | 11/2000 | Steed | ................... | B60Q 1/0023 348/148 |
| 6,509,832 B1 * | 1/2003 | Bauer | .................. | B60Q 1/0023 340/425.5 |
| 7,619,680 B1 | 11/2009 | Bingle et al. | | |
| 8,427,288 B2 | 4/2013 | Schofield et al. | | |
| 2005/0206780 A1 * | 9/2005 | Iwasaki | ..................... | B60R 1/00 348/373 |
| 2005/0275521 A1 * | 12/2005 | Li | ......................... | B60Q 1/2607 340/468 |
| 2009/0027497 A1 * | 1/2009 | Peacock | ................... | H04N 7/18 348/143 |
| 2013/0058120 A1 | 3/2013 | Schutz | | |
| 2013/0076007 A1 * | 3/2013 | Goode | ..................... | B60D 1/36 280/504 |
| 2014/0055616 A1 | 2/2014 | Corcoran et al. | | |
| 2015/0274091 A1 * | 10/2015 | Lang | ...................... | B60R 11/04 348/148 |

FOREIGN PATENT DOCUMENTS

| | | |
|---|---|---|
| JP | H09240371 A | 9/1997 |
| JP | 2006231988 A | 9/2006 |
| JP | 2013216290 A | 10/2013 |

OTHER PUBLICATIONS

English machine translation for JP2013216290A.
English machine translation for JPH09240371A.
English machine translation for JP2006231988A.

* cited by examiner

*Primary Examiner* — W B Perkey
(74) *Attorney, Agent, or Firm* — Jason Rogers; King & Schickli, PLLC

(57) ABSTRACT

A camera assembly includes a light assembly lens having a camera aperture and a seal ring received and held in the camera aperture. In addition, the camera assembly includes a camera having an outer housing projecting into the seal ring and a seal between the seal ring and the outer housing.

15 Claims, 3 Drawing Sheets

SEAL RING FOR PICKUP TRUCK BOX CAMERA IN CENTER HIGH MOUNT STOP LAMP

TECHNICAL FIELD

This document relates generally to the motor vehicle equipment field and, more particularly, to a camera assembly for a pickup truck box camera positioned in a center high mount stop lamp.

BACKGROUND

This document relates to a camera assembly such as used for a pickup truck box camera in a center high mount stop lamp. Such a camera assembly must seal to the outer lens of the stop lamp so that water does not get inside the stop lamp assembly. Significantly, the camera must point down to show a full view of the truck box. In contrast, the outer lens die draw points upward, in a different direction than the camera. As a consequence, the lens cannot be molded to include a cylinder for the camera seal. This document relates to a new and improved camera assembly that addresses and solves this problem.

SUMMARY

In accordance with the purposes and benefits described herein, a new and improved camera assembly is provided. That camera assembly comprises a light assembly lens including a camera aperture, a seal ring received and held in the camera aperture, a camera including an outer housing projecting through the seal ring and a seal between the seal ring and the outer housing. In one possible embodiment, the seal ring includes an annulus and a seating flange encircling the annulus. In one possible embodiment, a mounting tab is carried on the seating flange. That mounting tab may extend concentrically around the annulus.

In one possible embodiment, the light assembly lens includes a circular mounting groove receiving the mounting tab. A vibration weld secures the seal ring in the camera aperture to the light assembly lens.

In one possible embodiment, the seal includes multiple ribs that engage the seal ring. In one possible embodiment, the outer housing includes a channel and the seal is received and held in that channel.

In accordance with an additional aspect, a center high mount stop lamp is provided incorporating the camera assembly. In another possible aspect, a motor vehicle is provided incorporating the camera assembly.

In accordance with yet another aspect, a method is provided for securing a camera in a light assembly lens. That method may be broadly described as comprising the steps of molding the light assembly lens with a camera aperture and securing a seal ring in the camera aperture. The method further includes positioning the seal on an outer housing of the camera and inserting the camera into the seal ring with the seal sealing between the outer housing and the seal ring.

In accordance with one possible embodiment, the method also includes vibration welding the seal ring in the camera aperture to the light assembly lens. Further the method includes directing the camera in a different direction than a die draw direction for the light assembly lens.

In the following description, there are shown and described several preferred embodiments of the camera assembly. As it should be realized, the camera assembly is capable of other, different embodiments and its several details are capable of modification in various, obvious aspects all without departing from the camera assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the camera assembly and together with the description serve to explain certain principles thereof. In the drawing figures.

Reference will now be made in detail to the present preferred embodiments of the camera assembly, examples of which are illustrated in the accompanying drawing figures.

DETAILED DESCRIPTION

Figure 1:
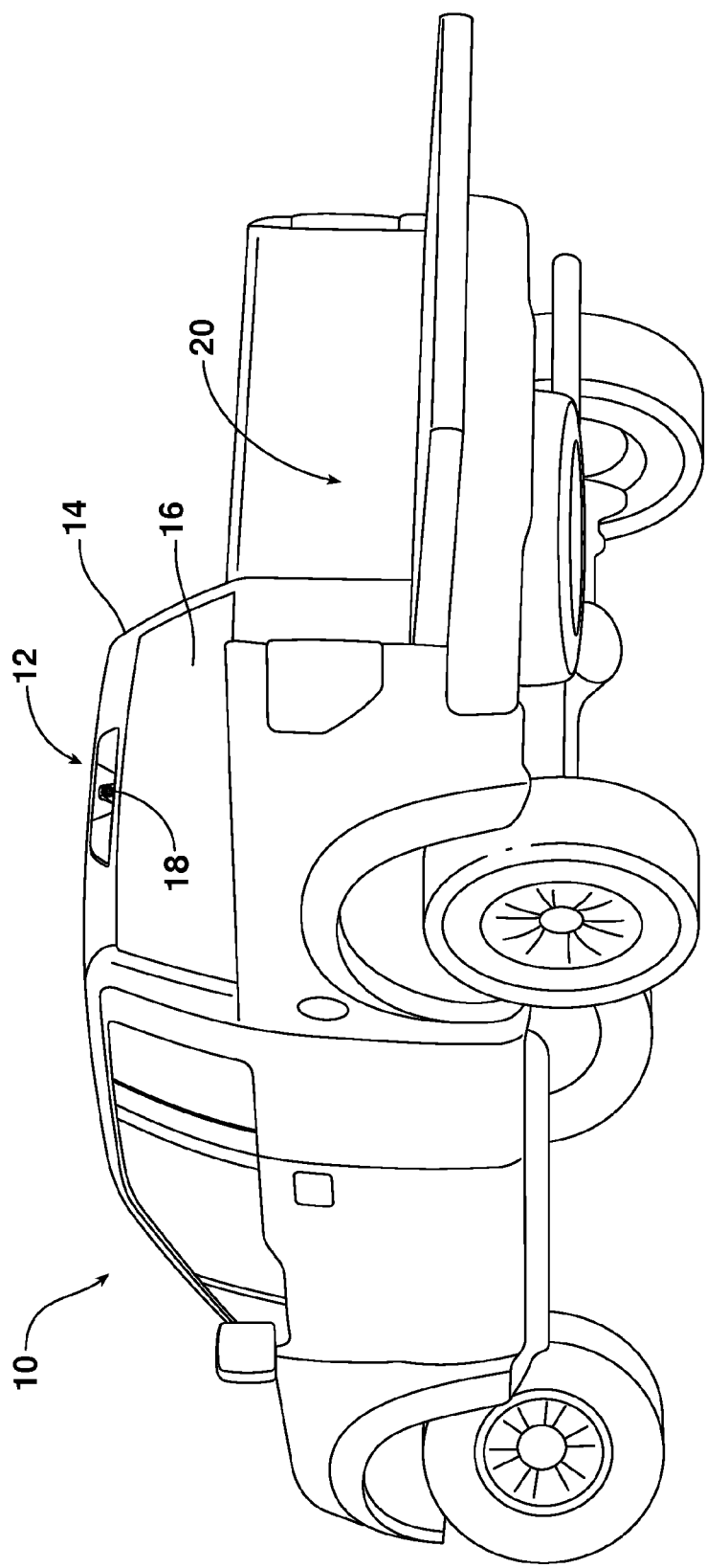
FIG. 1 is a perspective view of a pickup truck incorporating a high mount stop lamp equipped with the camera assembly that is the subject matter of this document.
Figure 2:
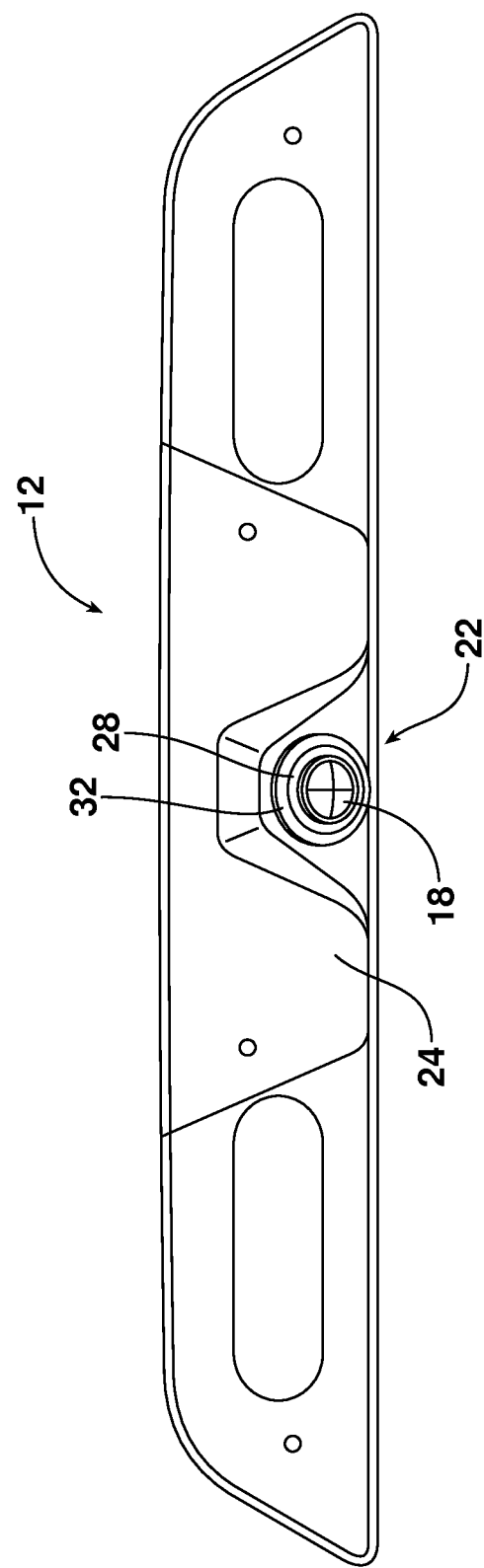
FIG. 2 is a detailed front elevational view of the center high mount stop lamp illustrated in FIG. 1.

Reference is now made to FIGS. 1 and 2, illustrating a motor vehicle in the form of a pickup truck 10 equipped with a center high mount stop lamp 12 positioned at the center of the pickup truck cab 14 overlying the rear window 16. The center high mount stop lamp 12 includes an integral pickup truck box camera 18 that is directed downwardly to allow viewing of the pickup truck box 20. See also FIGS. 2 and 3.

Figure 3:
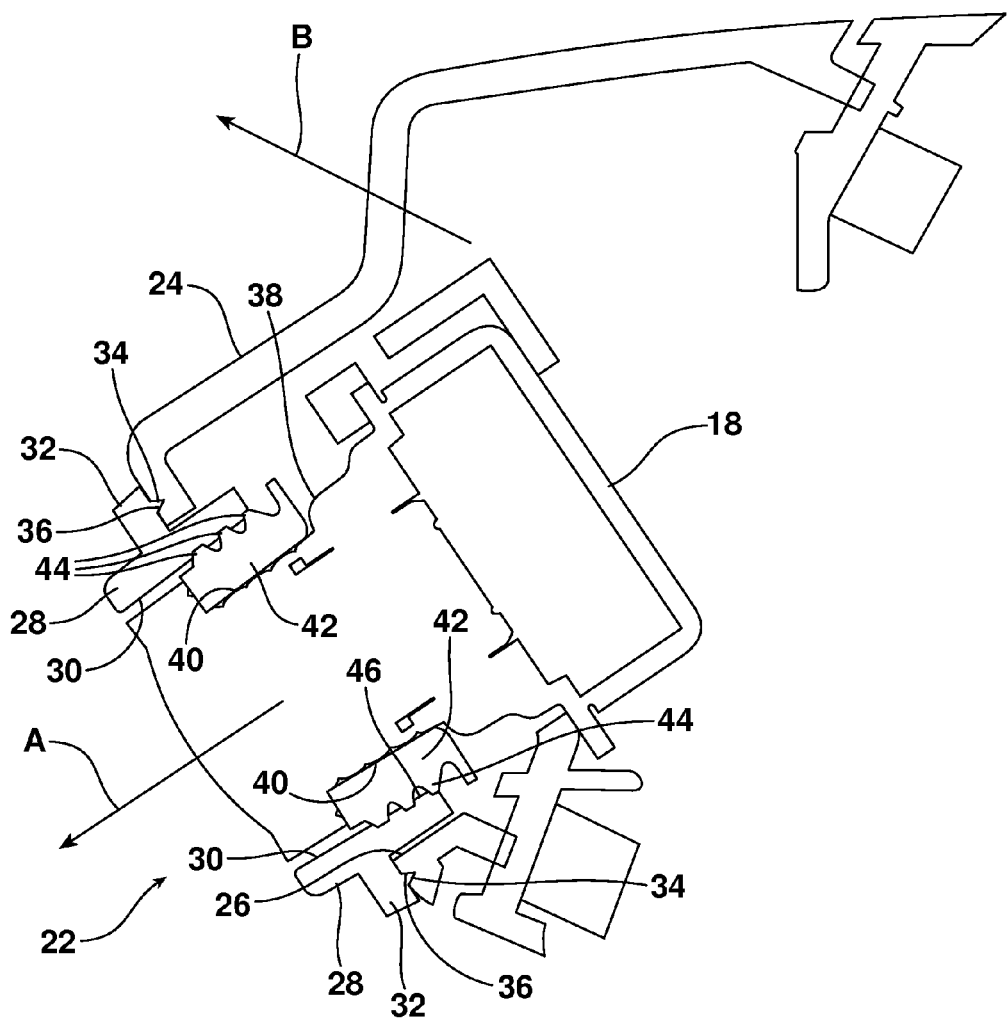
FIG. 3 is a detailed cross-sectional view fully illustrating the construction of the camera assembly including the light assembly lens with camera aperture, seal ring received and held in the camera aperture, the camera, and the seal between the seal ring and the outer housing of the camera.

References is now made to FIGS. 2 and 3 illustrating the camera assembly 22 that is the subject matter of this document. As illustrated, the camera assembly 22 includes a light assembly lens 24 that is formed or molded to include a camera aperture 26. A seal ring 28 is received and held in the camera aperture 26. The seal ring 28 includes an annulus 30 and a seating flange 32 encircling the annulus 30. A mounting tab 34 is carried on the seating flange 32. The mounting tab extends concentrically around the annulus 30.

As illustrated in FIG. 3, the light assembly lens 24 includes a circular mounting groove 36 receiving a melting tab 34. During assembly, the seal ring 28 is pushed into the camera aperture 26 so that the mounting tab 34 is received in the mounting groove 36. Vibration welding is then completed to secure the seal ring 28 in the camera aperture 26 and weld the ring 28 to the lens 24.

As further illustrated in FIG. 3, the camera 18 includes an outer housing 38 and a channel 40. A seal 42 is received and held in the channel 40. The seal includes multiple ribs 44. During assembly, the camera 18 is inserted into the seal ring 28 so that the ribs 44 engage the face 46 of the annulus 30 and provide a watertight seal between the seal ring 28 and the outer housing 38 of the camera 18. This prevents the intrusion of water or moisture into the center of the stop lamp 12.

Also disclosed is a method of securing a camera 18 in a light assembly lens 24. This method includes the step of molding the light assembly lens 24 with a camera aperture 26, securing the seal ring 28 in the camera aperture, positioning the seal 42 on an outer housing 38 of the camera 18 and inserting the camera 18 into the seal ring with the seal sealing between the outer housing and the seal ring as best illustrated in FIG. 3. As previously noted, vibration welding may be utilized for securing the seal ring 28 in the camera aperture 26 of the light assembly lens 24.

As should be appreciated from viewing FIG. 3, the method may include directing the camera 18 in a first direction A that is different from the die draw direction B for the light assembly lens 24. Thus, the camera 18 and its operating lens 48 may be directed downwardly into the pickup truck box 20 regardless of the die draw direction required to produce the light assembly lens 24. Advantageously, the camera assembly 22 allows the camera to be oriented in any desired direction regardless of the die draw direction for the light assembly lens 24. Further, the camera assembly 22, with the separate seal ring 28 is relatively inexpensive to produce, provides a secure mounting for the camera 18 and an excellent seal to prevent intrusion of water and moisture into the center high mount stop lamp 12.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A camera assembly, comprising:
   a light assembly lens including a camera aperture;
   a seal ring received and held in said camera aperture;
   a camera including an outer housing projecting through said seal ring; and
   a seal between said seal ring and said outer housing.

2. The camera assembly of claim 1 wherein said seal ring includes an annulus and a seating flange encircling said annulus.

3. The camera assembly of claim 2, further including a mounting tab carried on said seating flange.

4. The camera assembly of claim 3, wherein said mounting tab extends concentrically around said annulus.

5. The camera assembly of claim 4, wherein said light assembly lens includes a circular mounting groove for receiving said mounting tab.

6. The camera assembly of claim 5, further including a vibration weld securing said seal ring in said camera aperture to said light assembly lens.

7. The camera assembly of claim 5, wherein said seal includes multiple ribs engaging said seal ring.

8. The camera assembly of claim 7, wherein said outer housing includes a channel and said seal is received and held in said channel.

9. The camera assembly of claim 1, wherein said seal includes multiple ribs engaging said seal ring.

10. The camera assembly of claim 9, wherein said outer housing includes a channel and said seal is received and held in said channel.

11. A center high mount stop lamp incorporating the camera assembly of claim 1.

12. A motor vehicle incorporating the camera assembly of claim 1.

13. A method of securing a camera in a light assembly lens, comprising:
    molding said light assembly lens with a camera aperture;
    securing a seal ring in said camera aperture;
    positioning a seal on an outer housing of said camera; and
    inserting said camera into said seal ring with said seal sealing between said outer housing and said seal ring.

14. The method of claim 13 including vibration welding said seal ring in said camera aperture to said light assembly lens.

15. The method of claim 14 including directing said camera in a different direction than a die draw direction for said light assembly lens.

* * * * *